US012498156B2

(12) United States Patent
Tiernan et al.

(10) Patent No.: US 12,498,156 B2
(45) Date of Patent: Dec. 16, 2025

(54) ANOMALY DETECTION FOR REFRIGERATION SYSTEMS

(71) Applicant: ACCRUENT LLC, Austin, TX (US)

(72) Inventors: Carter Decew Tiernan, Pittsburgh, PA (US); Basant Singhatwadia, Eden Prairie, MN (US); Rosemary Elaine Pekarek, Plymouth, MN (US)

(73) Assignee: ACCRUENT LLC, Austin, TX (US)

( * ) Notice: Subject to any disclaimer, the term of this patent is extended or adjusted under 35 U.S.C. 154(b) by 268 days.

(21) Appl. No.: 18/309,395

(22) Filed: Apr. 28, 2023

(65) Prior Publication Data

US 2023/0349610 A1 Nov. 2, 2023

Related U.S. Application Data

(63) Continuation-in-part of application No. 17/733,624, filed on Apr. 29, 2022.

(51) Int. Cl.
*F25B 49/02* (2006.01)

(52) U.S. Cl.
CPC .......... *F25B 49/02* (2013.01); *F25B 2500/06* (2013.01); *F25B 2700/2104* (2013.01); *F25B 2700/2106* (2013.01)

(58) Field of Classification Search
CPC .......... F25B 2500/06; F25B 2700/2104; F25B 2700/2106; F25B 49/005; F25B 49/02
See application file for complete search history.

(56) References Cited

U.S. PATENT DOCUMENTS

| | | | |
|---|---|---|---|
| 11,232,371 B2 | 1/2022 | Li et al. | |
| 2012/0041575 A1 | 2/2012 | Maeda et al. | |
| 2013/0211787 A1 | 8/2013 | Kaufman et al. | |
| 2015/0269050 A1 | 9/2015 | Filimonov et al. | |
| 2015/0330924 A1 | 11/2015 | Budde | |
| 2016/0004978 A1 | 1/2016 | Goldschmidt et al. | |
| 2019/0072320 A1* | 3/2019 | Devi | F25D 29/008 |
| 2020/0379454 A1* | 12/2020 | Trinh | G05B 23/024 |
| 2020/0380391 A1 | 12/2020 | Allard et al. | |

(Continued)

OTHER PUBLICATIONS

Chitta Ranjan, "LSTM Autoencoder for Extreme Rare Event Classification in Keras," May 17, 2019.

(Continued)

*Primary Examiner* — Henry T Crenshaw
(74) *Attorney, Agent, or Firm* — Polsinelli LLP

(57) ABSTRACT

Methods and systems are described for anomaly detection in refrigeration systems. A process for providing anomaly detection for refrigeration systems includes receiving telemetry data of one or more refrigeration systems, including measured temperature values and setpoint temperature values; processing the telemetry data to determine machine learning input data based at least in part on at least a portion of the measured temperature values and at least a portion of the setpoint temperature values; and using one or more hardware processors to apply the machine learning input data to a trained anomaly detection machine learning model to determine periodic anomaly metrics. The process provides an automatically determined indication based at least in part on at least a portion of the periodic anomaly metrics.

18 Claims, 10 Drawing Sheets

(56) References Cited

U.S. PATENT DOCUMENTS

| | | | |
|---|---|---|---|
| 2021/0217097 | A1 | 7/2021 | Trainor et al. |
| 2023/0325292 | A1 | 10/2023 | Ardel et al. |

OTHER PUBLICATIONS

Jeremy Kepner et al., “Lustre, Hadoop, Accumulo,” Conference: 2015 IEEE High Performance Extreme Computing Conference (HPEC), pp. 1-5, Sep. 2015.
International Search Report and Written Opinion mailed Jul. 28, 2023 in International Application PCT/US2023/020419.
Hosseini, Sayed Saeed et al., “A Practical Approach to Residential Appliances On-Line Anomaly Detection: a Case Study of Standard and Smart Refrigerators,” IEEE Access, vol. 8, Mar. 23, 2020.
Vigoya, Laura et al., “IoT Dataset Validation Using Machine Learning Techniques for Traffic Anomaly Detection,” Electronics, vol. 10, Nov. 19, 2021.
International Search Report and Written Opinion mailed Aug. 8, 2024 in International Application PCT/US2024/026487.
Office Action mailed May 9, 2025 in U.S. Appl. No. 17/733,624.

* cited by examiner

*Flagged System Conditions*

Period: All ▾ Filter by: ▾

| Site name | Controller name | Controller description | Asset Tag | Rule type/ category | Flagged condition name | Issue opened | Issue status | Launch graphing tool |
|---|---|---|---|---|---|---|---|---|
| Store A, City A | AB1-1 | ACMES0001 Dairy | ACMES0001 | Preventative/ Maintenance | Refrigeration Anomaly Detection | 02/24/2022 2:08:55 GMT | Open – Not evaluated – Site | Launch graph |
| Store A, City A | AB2-1 | ACMES0002 Produce | ACMES0002 | Preventative/ Maintenance | Refrigeration Anomaly Detection | 02/23/2022 2:08:33 GMT | Open – Not evaluated – Site | Launch graph |
| Store B, Town B | DC-1 | BUSIS0001 Produce | BUSIS0001 | Preventative/ Maintenance | Refrigeration Anomaly Detection | 02/23/2022 4:13:45 GMT | Open – Not evaluated – Site | Launch graph |
| Store C, Village C | HF-1 | CORPS0001 Dairy | CORPS0001 | Preventative/ Maintenance | Refrigeration Anomaly Detection | 02/23/2022 10:10:02 GMT | Open – Not evaluated – Site | Launch graph |

FIG. 4

Telemetry | Telemetry Text | Rule Violations

| **Channel** | **Superheat** | **Air Return Temp** | **Air Discharge Temp** |
|---|---|---|---|
| Current Value | ○ 11.56 | ○ 5.57 | ○ -0.12 |
| Current Date | 2/21/22 5:00 | 2/21/22 5:00 | 2/21/22 5:00 |
| Max Telemetry Value | 14.5 C | 8.617 C | 4.017 C |
| Max Telemetry Date | 2/9/22 21:00 | 2/20/22 8:00 | 2/20/22 12:00 |
| Min Telemetry Value | 1.375 C | 0.833 C | -2.45 C |
| Min Telemetry Date | 1/25/22 2:00 | 2/19/22 17:00 | 2/4/22 14:00 |
| Avg Telemetry Value | 9.614 C | 4.968 C | 0.346 C |

ANOMALY DETECTION FOR REFRIGERATION SYSTEMS

CROSS-REFERENCE TO RELATED APPLICATIONS

This application is a continuation-in-part of U.S. patent application Ser. No. 17/733,624 filed Apr. 29, 2022, which is incorporated herein by reference in its entirety for all purposes.

TECHNICAL FIELD

This disclosure generally relates to anomaly detection in electronic devices; and more specifically to remote monitoring of electronic device to detect and predict anomalous conditions.

BACKGROUND

Refrigeration systems typically require periodic maintenance in order to function as desired. Typical service plans are reactive maintenance, which is performed when the system fails; planned preventative maintenance, which is performed according to a schedule regardless of the system's health; and condition-based maintenance, which is based on an assessment of the system's current functional health. However, conventional techniques typically result in loss of productivity or unplanned expenses because failures are caught too late or more maintenance is performed than is necessary. For example, conventional condition-based maintenance schedules typically have many false positives and do not take into account the nuances of refrigeration systems.

BRIEF DESCRIPTION OF THE DRAWINGS

Various implementations of the invention are disclosed in the following detailed description and the accompanying drawings.

FIG. 4 shows an example of graphical user interface for remote monitoring of refrigeration systems according to aspects of the present disclosure.

FIG. 5B shows an example of a graphical user interface for anomaly detection for refrigeration systems according to aspects of the present disclosure.

DETAILED DESCRIPTION

Figure 1:
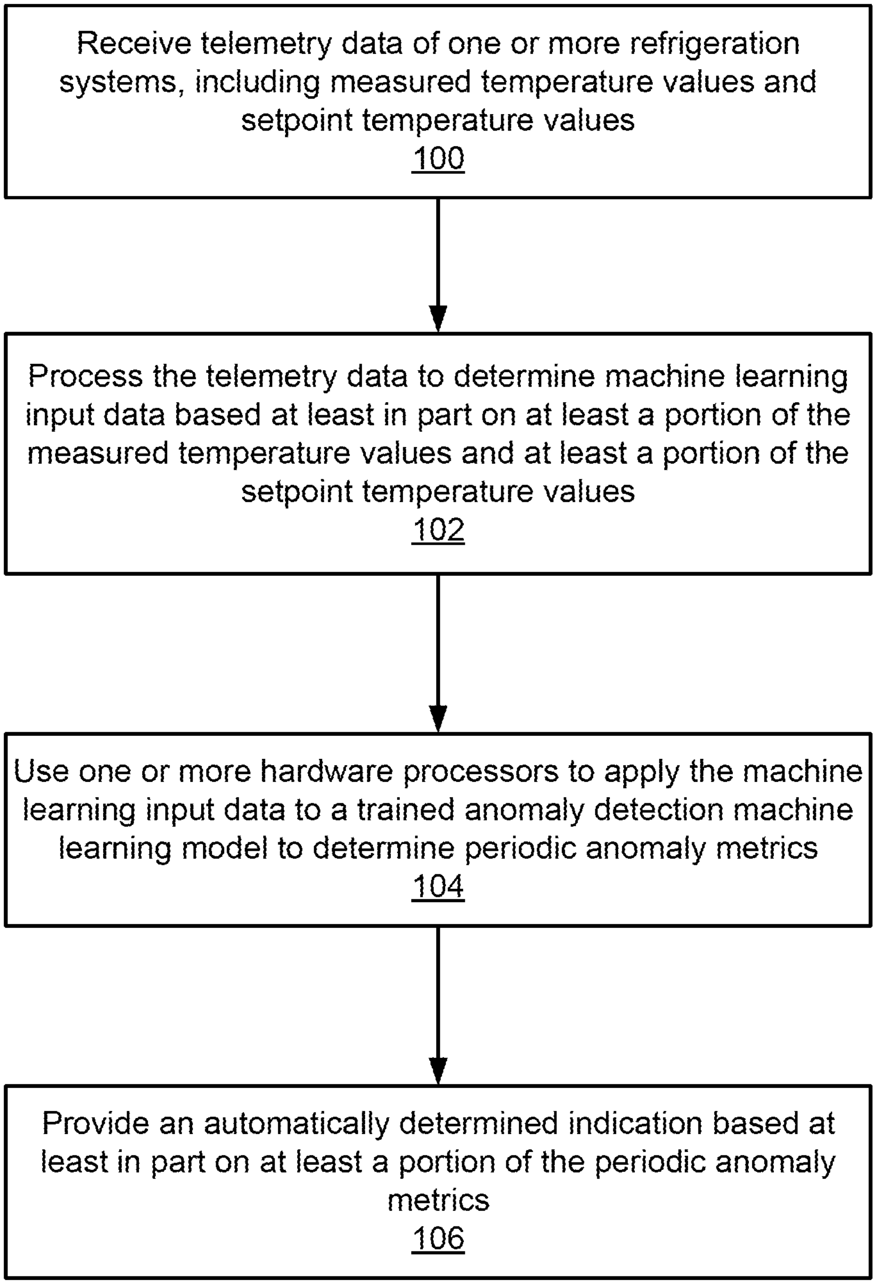
FIG. 1 is a flowchart of an example process for anomaly detection for refrigeration systems according to aspects of the present disclosure.

Anomaly detection for refrigeration systems is disclosed. Refrigeration systems are also sometimes referred to herein as equipment. Some systems include a case in which products are kept at a desired temperature range. The disclosed techniques predict failure of equipment in advance based on the characteristics of the data collected from the equipment. The disclosed anomaly detection techniques are more accurate and precise than conventional techniques, and find application in various service plans/regimes including reactive maintenance, planned preventative maintenance, and predictive maintenance.

In one aspect, they allow for service level agreements (SLAs) to be adjusted (e.g., relaxed) by being able to predict failure with greater certainty and specificity with regard to time, among other things. If prediction of failure can only be made 12-24 hours prior to actual failure, then the SLA would need to be 12 hours or less in order to service the equipment prior to failure. The disclosed techniques allow failure to be predicted further in advance, so the SLA can be increased, giving a technician more time to service the equipment, and reducing the service charge In other words, planned preventative maintenance schedules can be adjusted to save time and money. For example, the disclosed techniques predict with high confidence that the equipment will fail in the next three days, enabling the service level agreement (SLA) to be increased to three days.

In another aspect, schedules for planned preventative maintenance may be adjusted to reduce the frequency of service so that unnecessary maintenance trips and costs are not incurred. Scheduled maintenance can therefore be guided with greater confidence using the disclosed anomaly detection techniques.

Conventional anomaly detection techniques typically do not work well for refrigeration systems. One reason is that while conventional rule-based techniques monitor various aspects of equipment, they may miss some nuances of the behavior of refrigeration systems. Another reason is that generic anomaly detection techniques are not adapted to the characteristics of refrigeration systems. For example, in many refrigeration systems, the goal is to maintain a low temperature. However, there are defrost periods during which the refrigerator is circulating warm instead of cool air. As such, data may be noisy or otherwise difficult to process. As another example, anomaly detection based on work orders may be inaccurate because work orders are manually completed by a technician who services the equipment and thus have a wide range of variability and possibility of human error. A failure reason might not be fully captured by a work order because a single label is inadequate.

In various examples, a process for anomaly detection for refrigeration systems includes receiving telemetry data of one or more refrigeration systems, wherein the data includes measured temperature values and setpoint temperature values. As further described herein, the data may include state information (such as operating mode that defines if the case is defrosting or not), environmental information such as outdoor temperature, calculated fields such as "superheat" which defines the delta between the refrigerants boiling temperature and its actual temperature after the evaporator. The process includes processing the telemetry data to determine machine learning input data based at least in part on at least a portion of the measured temperature values and at least a portion of the setpoint temperature values. The process includes using one or more hardware processors to apply the machine learning input data to a trained anomaly detection machine learning model to determine periodic anomaly metrics. The process includes providing an automatically determined indication based at least in part on at least a portion of the periodic anomaly metrics. The disclosed techniques may be applied to any refrigeration system including remote multideck chillers. For example, the architecture of the disclosed anomaly detection machine learning model remains the same while the weights and features can be adapted to accommodate the expected behavior of a specific refrigeration system.

FIG. 1 is a flowchart of an example process for anomaly detection for refrigeration systems according to aspects of the present disclosure. The process can be performed by a system such as the ones shown in FIG. 2, 6, or 9.

The process begins by receiving telemetry data of one or more refrigeration systems, including measured temperature values and setpoint temperature values (100). The telemetry data may be collected by one or more sensors that captures data associated with the refrigeration system(s) and transmits the data to a processing system via an API. For example, sensors may be included in or provided at various locations inside the refrigeration equipment such as within the case (e.g., at the air intake and output), outside the case (e.g., the evaporator inlet and outlet), or elsewhere in the system. Sensors may measure information external to the equipment, such as ambient condition/temperature of a store, characteristics of the environment in which the equipment is installed, weather characteristics, or the like. The temperature and setpoint temperature values may include or be accompanied by state information. In various examples, the telemetry data is collected periodically such as 15-minute intervals.

A setpoint value refers to a value that is only recorded when the value changes. The setpoint temperature value (also sometimes called cut in temperature) refers to a target temperature value, e.g., a case or cabinet setpoint. Typically, the air will turn on when the case temperature deviates from the setpoint temperature by more than a threshold value and the air will turn off when the case temperature deviates from the setpoint temperature by less than a threshold value.

In various examples, the telemetry data is collected periodically and continuously. The data can be processed by a long short-term memory (LSTM) autoencoder as further described herein. By way of non-limiting example, telemetry data includes one or more of the following:

- Setpoint
- Air off, temperature of the air entering the case
- Air on, temperature of the air exiting the case
- Case last defrost termination temperature, which is the temperature of the case at the end of the most recent defrost period
- Superheat, which is a difference (delta) between the boiling point of the refrigerant (the substance used to cool the refrigerator) and its actual temperature after the evaporator
- Weather temperature, which can be obtained periodically (e.g., hourly) of the outside (e.g., temperature or humidity) or other environment in which the refrigeration equipment resides (e.g., store ambient temperature)
- Defrost state, which indicates whether the refrigeration system is in a defrost state or a refrigeration state and can be used to determine how long it takes to defrost
- Operating mode, such as refrigeration, defrost, lockdown, fans only recovery, drop down The process processes the telemetry data to determine machine learning input data based at least in part on at least a portion of the measured temperature values and at least a portion of the setpoint temperature values (102). In various examples, self-supervised machine learning is performed using the machine learning input data. The machine learning input data refers to features that can be input to a machine learning model for training.

The telemetry data can be processed in one or more of the following ways: encode categorical variables, forward fill missing values, determine relative values, or normalize values. Encoding categorical variables (e.g., defrost state and operating mode) refers to transforming variables from multiple distinct classes to numeric data with values that represent whether the category was seen (e.g., 1.0 is yes and 0.0 is no or any other class was seen). Forward filling refers to replacing null values with last seen values or 0.0 Relative values can be determined by subtracting each value by the setpoint temperature value, so the values are all relative deltas to the setpoint temperature value. Alternatively, temperature values can be processed to be a relative delta to some other reference value. Features can be normalized so their values are within the same bounds (e.g., between 1 and 0). Example normalization techniques include min-max and standard score. In various examples, the processing of air off, air on, case last defrost termination temperature, superheat, and weather temperature is performed in the following order: relative, normalize, forward fill, and/or the processing of defrost state and operating mode is transforming categorical variables then filled with 0.

Figure 9:
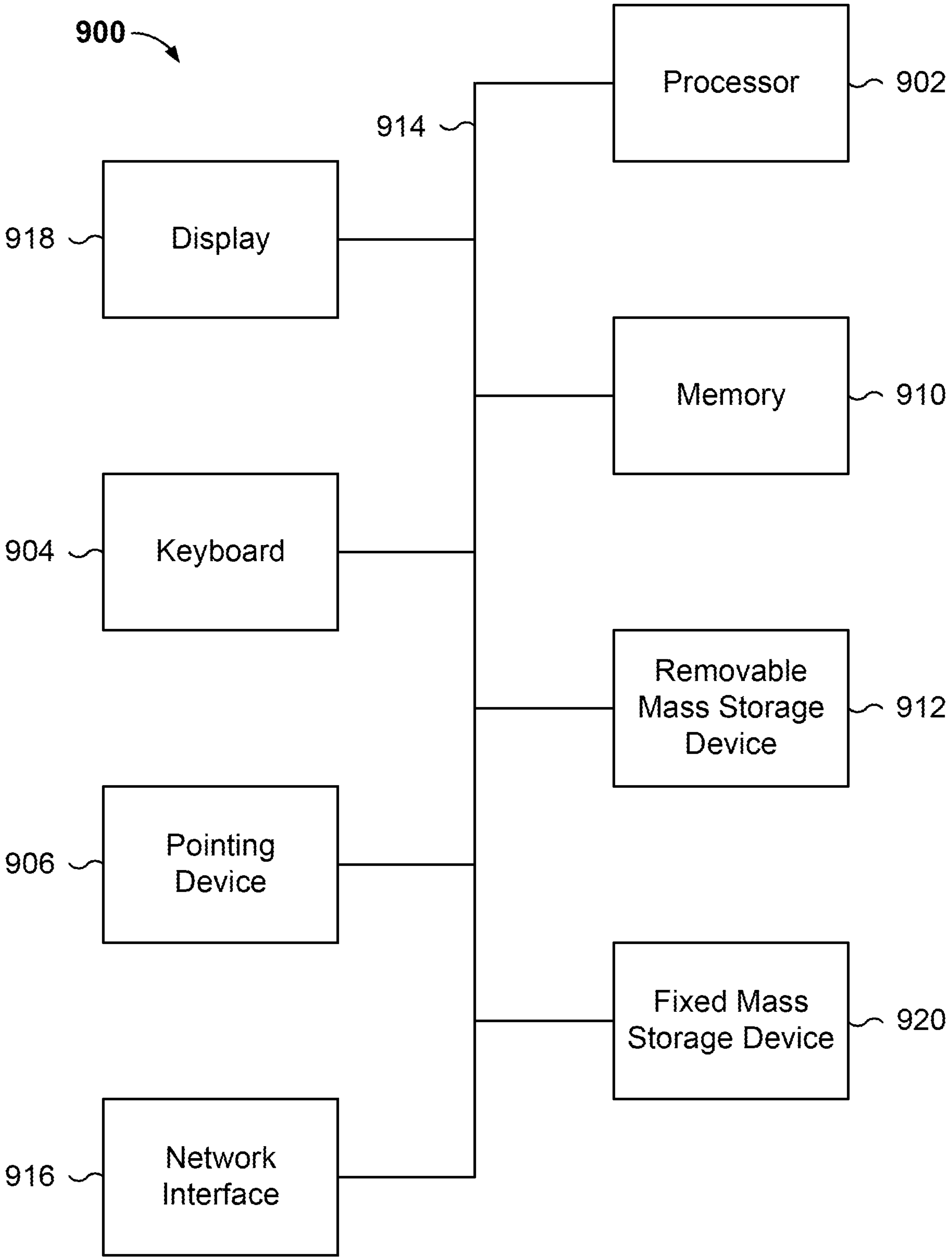
FIG. 9 illustrates a block diagram of an example programmed computer system for anomaly detection for refrigeration systems according to aspects of the present disclosure.

The process uses one or more hardware processors to apply the machine learning input data to a trained anomaly detection machine learning model to determine periodic anomaly metrics (104). An example of a hardware processor to apply the machine learning is shown in FIG. 9. In various examples, periodic anomaly metrics include one or more of the following an anomaly score or an anomaly count. Alerts are generated via the anomaly metrics or rules-based systems and may include messages indicating an operating state or characteristic such as information about various aspects of how a refrigeration system is operating. In various examples, the process generates an anomaly alert when the anomaly score exceeds a positive threshold defining the acceptable level of unusualness of the input data (the received telemetry data for example) for an extended period of time (where the period of time can be defined by a threshold). The amount of time anomalous behavior must be sustained to generate an alert is defined as a threshold to the anomaly count, which is calculated based on the anomaly score over time. The anomaly alert can be validated to be correlated with failure during model training by using work order, alarm data, or the like.

In various examples, the anomaly detection machine learning model is trained using self-supervised learning. For example, the anomaly detection machine learning model includes an autoencoder. An autoencoder includes an encoder network that transforms input data (e.g., telemetry, weather, and operating state data) into a latent space and a decoder network that learns to recreate the input data from the latent space representation. The mean absolute difference between the input and output of the model is an anomaly metric. An example of a process to train the anomaly detection machine learning model is further described with respect to FIG. 3A.

The process provides an automatically determined indication based at least in part on at least a portion of the periodic anomaly metrics (106). The indication can be automatically determined by categorizing an anomaly metric. For example, if an anomaly metric is above a threshold, the process determines that equipment failure is imminent (within some threshold failure time) and generates an indication. The indication may include details such as location of equipment, expected time to failure, specific locations or parts within the equipment that caused the indication to be generated, etc.

Figure 5A:
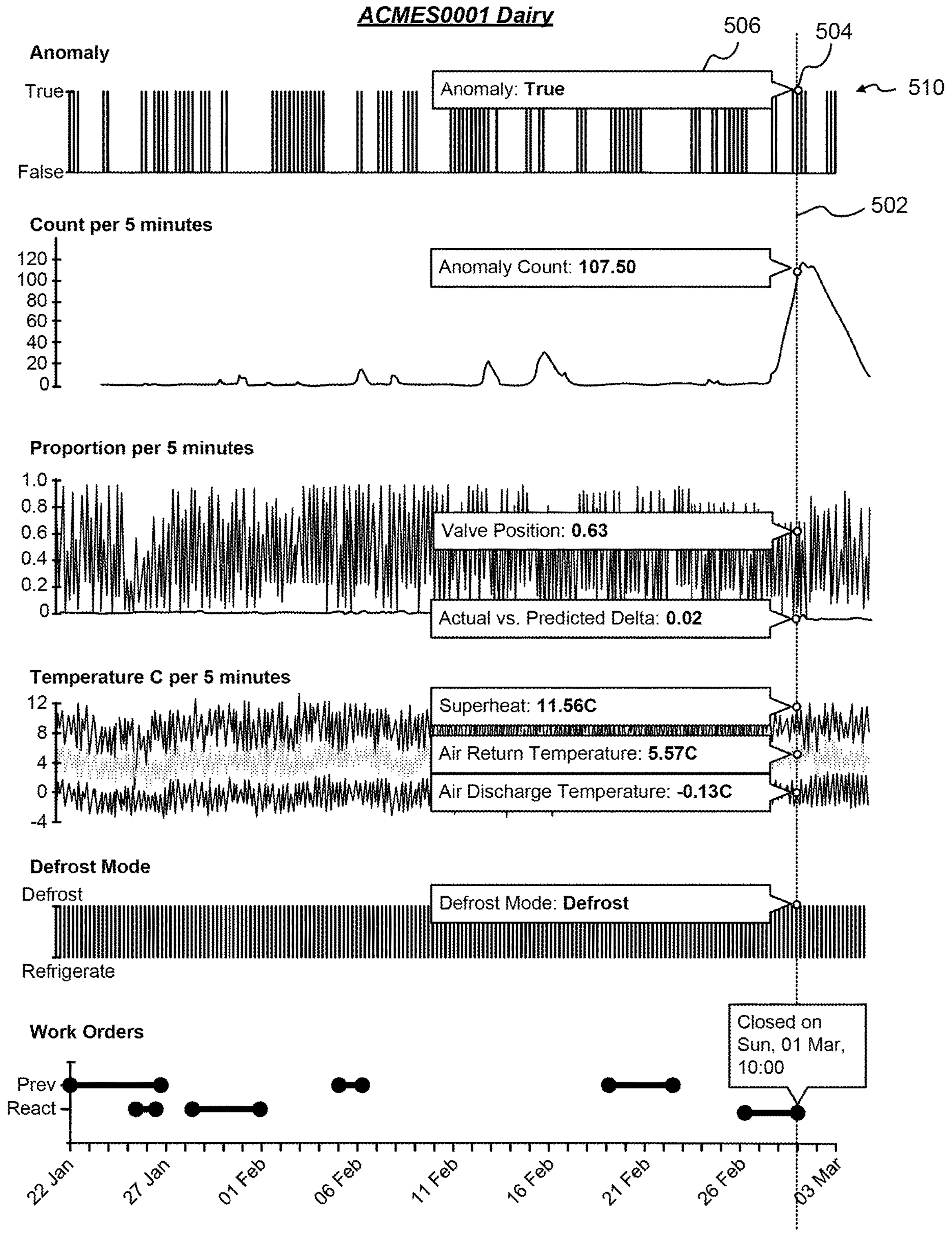
FIG. 5A shows an example of a graphical user interface for anomaly detection for refrigeration systems according to aspects of the present disclosure.

In various examples, the indication is output to a user interface such as a diagnostic tool, some examples of which are described with respect to FIGS. 4-5B. For example, the indication is provided on a graph such as the ones further described with respect to FIG. 5A. An analyst or technician can quickly and easily determine what caused equipment failure by looking at the indication. For example, when completing a work order, a technician can refer to the indication to determine what work needs to be done to service the equipment.

Figure 2:
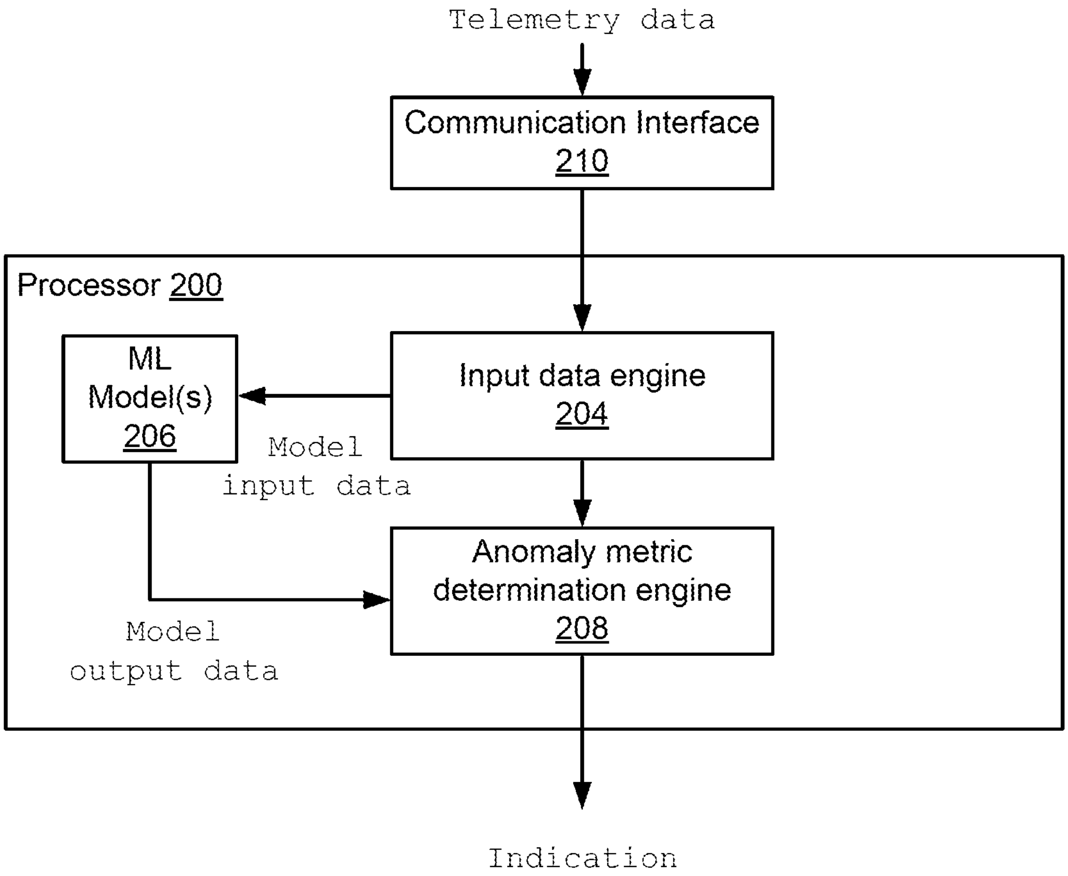
FIG. 2 is a block diagram illustrating an example system for anomaly detection for refrigeration systems according to aspects of the present disclosure.

FIG. 2 is a block diagram illustrating an example system for anomaly detection for refrigeration systems according to aspects of the present disclosure. The system includes a communication interface 210 and processor 200. The communication interface can be separate from the processor as shown or can be included in the processor. The communication interface can be implemented by a variety of hardware and/or software such as a network interface card. The communication interface is configured to receive telemetry data of one or more refrigeration systems including measured temperature values and setpoint temperature values.

Processor 200 includes an input data engine 204 and an anomaly metric determination engine 208. In various examples, processor 200 includes one or more machine learning models 206. Alternatively, one or more machine learning models can be remote from the processor and interact with the processor as described herein to provide input and output.

Input data engine 204 is configured to process telemetry data to determine machine learning input data based at least in part on at least a portion of the measured temperature values and at least a portion of the setpoint temperature values.

Anomaly metric determination engine 208 is configured to use one or more hardware processors to apply the machine learning input data to a trained anomaly detection machine learning model (206) to determine periodic anomaly metrics. In various examples, the anomaly detection machine learning model(s) 206 are trained using the process of FIG. 3A. Anomaly metric determination engine 208 is configured to provide an automatically determined indication based at least in part on at least a portion of the periodic anomaly metrics.

In operation, the system shown in FIG. 2 is configured to perform the process of FIG. 1 by receiving telemetry data via communication interface 210. Input data engine 204 processes the telemetry data by transforming categorical variables, forward filling, determining relative values, and/or nominalizing values to generate model input data. The model input data is processed by trained machine learning models 206 to produce model output data for processing by anomaly metric determination engine 208. Anomaly metric determination engine 208 determines one or more metrics. The metrics or an associated indication is output by processor 200.

In various examples, the system of FIG. 2 can be implemented by infrastructure equipped to handle big data such as a Hadoop® Distributed File System (HDFS) to store collected telemetry data, Spark® to process the data for model training, and Kubernetes® to orchestrate automation of the deployment, scaling, and management. A Tensorflow® model can be built to process a data stream (e.g., data in daily batches).

Figure 3A:
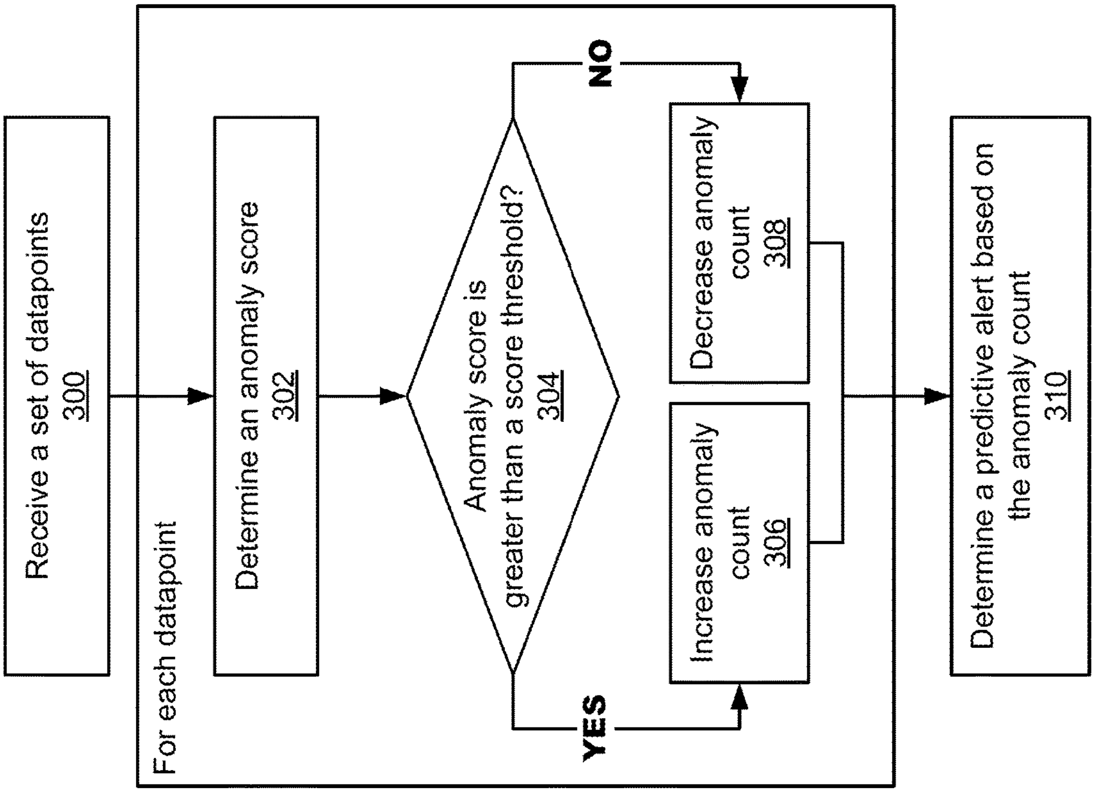
FIG. 3A is a flow diagram illustrating an example process for training an anomaly detection machine learning model according to aspects of the present disclosure.

FIG. 3A is a flow diagram illustrating an example process for training an anomaly detection machine learning model according to aspects of the present disclosure. The process can be performed by a system such as the one shown in FIGS. 2, 6, or FIG. 9. The process of FIG. 3A will be explained with the aid of FIG. 3B. In this example, the machine learning model is self-supervised, meaning it does not need label data. Past equipment failures can be collected to validate the model. The time-dependent temperature data also correspond to known operating modes (e.g., refrigeration cycles), which may provide another layer of validation. An LSTM learns a function representing the data distribution, and thus learns the nuances of refrigeration systems. For example, the LSTM learns that during a given time there are defrost periods, which are not necessarily equipment failures although they appear to be anomalous to an untrained model.

Figure 3B:
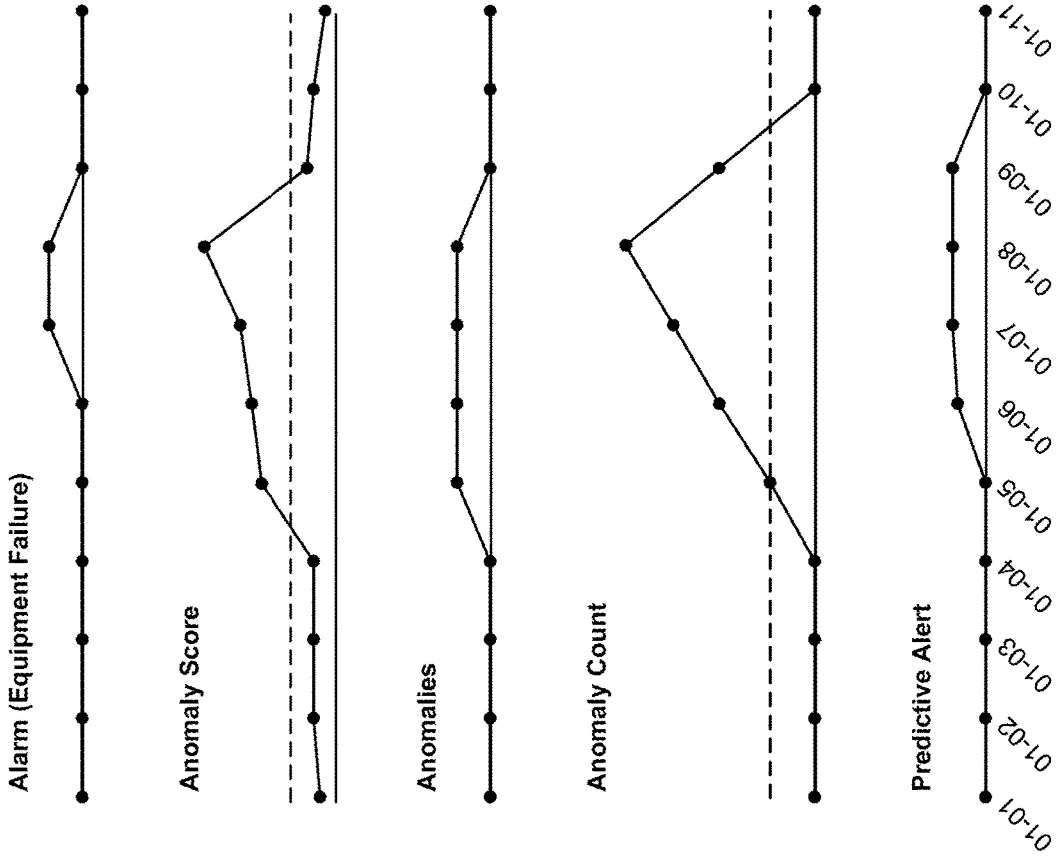
FIG. 3B shows an example of data associated with training an anomaly detection machine-learning model according to aspects of the present disclosure.

FIG. 3B shows an example of data associated with training an anomaly detection machine-learning model according to aspects of the present disclosure. The top graph shows an actual alarm (equipment failure) in this example. The datapoints are collected over a time period ranging from January 1 (01-01) to January 11 (01-11). Here, the equipment fails beginning on January 7. The disclosed techniques can be applied to generate a predictive alert (bottom graph) without knowing the actual alarm.

Returning to FIG. 3A, the process begins by receiving a set of datapoints (300). For each datapoint, the process proceeds as follows. The process determines an anomaly score (302). In this example, the datapoints are collected over a time period ranging from January 1 (01-01) to January 11 (01-11). An anomaly score is determined for each datapoint. Referring to FIG. 3B, the anomaly score rises between January 4 and January 8 and falls after that date. As described herein, the anomaly score indicates unusualness of data and is a difference between the input and output of a machine learning model In various examples, the anomaly score can be determined based on historical scores. For example, the process analyzes the characteristics of a datapoint, metadata, and historical patterns to calculate the anomaly score for a given datapoint. A score threshold is represented by the dashed line.

Returning to FIG. 3A, the process determines whether an anomaly score is greater than a score threshold (304). The score threshold can be selected based on a desired level of sensitivity of the system to reduce the number of false positives or false negatives to an acceptable level. If the anomaly score is greater than the score threshold, the process proceeds to increase the anomaly count (306). Otherwise, if the anomaly score is not greater than the score threshold, the process decreases the anomaly count (308). In other words, the process determines whether to update an anomaly count based on whether the anomaly score meets a score threshold.

Referring to FIG. 3B, the values on January 5 through January 8 exceed the threshold, so they are counted as anomalies, as shown in the anomalies graph. The anomaly count graph shows a running count of the number of anomalies seen so far. A count threshold is represented by the dashed line, so if the running count exceeds the count threshold, then a predictive alert is generated for that datapoint.

The process determines a predictive alert based on the anomaly count (310). In various examples, a predictive alert is generated if the anomaly count exceeds a count threshold. The count threshold can be set to account for the characteristics of refrigeration systems or even specific models of refrigeration systems such as periods of defrost that do not indicate equipment failure. For example, short periods of anomalies (e.g., anomalous temperature) could simply indicate re-stocking and not equipment failure.

Referring to FIG. 3B, between January 6 and January 9, the anomaly count exceeds the threshold, so a predictive alert is generated on those days. Thus, the predictive alert begins on January 6, which accurately predicts failure in advance of actual equipment failure.

FIG. 4 shows an example of graphical user interface for remote monitoring of refrigeration systems according to aspects of the present disclosure. The graphical user interface (GUI) can be displayed when a user accesses a remote monitoring system or platform such as vxObserve by Accruent®. The GUI allows a user to navigate through various flagged system conditions (alerts). For example, the information can be sorted by time using the "Period" menu or filtered by various filters.

Each row in the table corresponds to an issue (flagged condition) and columns show aspects of the issue. The columns are merely exemplary and not intended to be limiting as different or additional aspects can be displayed In this example, the following information corresponding to each issue is displayed: site name, controller name, controller description, asset tag, rule type or category, flagged condition name, time when issue was opened, the status of the issue, and a link to launch a graphing tool. Other information such as issue time, security description, fixture ID, system component, and alarm status can be displayed.

Selecting the link to launch a graphing tool causes a user interface such as the ones shown in FIGS. 5A and 5B to be displayed. FIGS. 5A and 5B show user interfaces that are displayed in response to selecting the link for the first row, which corresponds to the controller ACMES0001 Dairy.

FIG. 5A shows an example of a graphical user interface for anomaly detection for refrigeration systems according to aspects of the present disclosure. The graphical user interface shows anomalies 510 detected for a controller (here, ACMES0001) along with other variables (also sometimes referred to as "refrigeration-dependent data"). In this example, the other variables include Count per 5 Minutes, Proportion per 5 Minutes, Temperature per 5 Minutes, Defrost Mode, and Work Orders. The variables that are shown along with "Anomaly" are merely exemplary and not intended to be limiting. Other variables besides the examples discussed herein may be shown instead or in addition to the ones shown in FIG. 5A. In this example, each graph shows a unit of measure and data for that unit of measure is plotted on that graph.

In various examples, a user can interact with the user interface to display details and other information. For example, the x-axis is time, and a user can move a bar 502 along the x-axis to display information at that point in time. The value of a variable at that time is indicated by a circle. For "Anomaly," the value 504 at (Time 1 March) is "True," which is also displayed in box 506. Similarly, the value for "Count per 5 Minutes" is 107.50. Several values can be plotted in a single graph, as shown in "Proportion per 5 Minutes" and "Temperature C per 5 Minutes," and each value has a corresponding box. Additional information can be displayed in the box such as Fixture ID, Controller Name, Asset Tag, System Component, Equipment Type, or the like.

"Count per 5 Minutes" shows a rolling count of anomalous periods. If a period is anomalous, then a value is added to the rolling count. If a period is not anomalous, then a value is decremented from the rolling count. For example, the value can be 1 if there are any anomalies in that period, or the value can be the number of anomalies within that period.

"Proportion per 5 Minutes" shows percentages. The valve position determines how much refrigerant is introduced. In the graph, a valve position of 1.0 means that valve is fully open, a valve position of 0.0 means the valve is fully closed, and a value between 0 and 1 is some intermediate position. Also plotted on this graph is the actual difference between temperatures vs. the predicted difference between temperatures in percentages. In this example, the difference in temperature is conveniently shown as a percentage although it need not be strictly a percentage, e.g., the value can be unbounded.

"Temperature C per 5 Minutes" shows the temperature (in Celsius) measured every five minutes. In this example, several temperatures are shown: superheat, which is a delta between the boiling point of the refrigerant (used to cool the refrigerator) and its actual temperature after the evaporator; air return temperature which is the temperature at the air return valve, and air discharge temperature, which is the temperature at the air discharge valve.

"Defrost Mode" shows whether the equipment is in defrost mode or refrigeration mode. In this example, the equipment periodically and regularly defrosts throughout the day.

"Work Orders" shows work orders over time. A line represents the duration of the work order, the left endpoint of the line representing when the work order was opened and the right endpoint of the line representing when the work order was closed. In this example, different categories of work orders are listed on the y-axis of the graph, the two categories being preventative maintenance ("Prev") and reactive maintenance ("React"). The preventative maintenance work orders are opened at regular intervals, here every 14 days. The reactive maintenance work orders are opened when equipment fails or is about to fail. Hovering over parts of graph may cause additional information to be displayed. For example, here the bar 502 shows that a reactive work order was closed on Sunday, 1 March at 10.00. Although not shown, additional information such as the priority of work order (low, medium, high for example) can be presented on the graph.

FIG. 5B shows an example of a graphical user interface for anomaly detection for refrigeration systems according to aspects of the present disclosure. In this example, telemetry data is displayed in panel 550. In various examples, the panel can be displayed together with the graphs shown in FIG. 5A. For example, panel 550 is displayed as an overlay, pop-up, or next to the graphs shown in FIG. 5A. This enables more detailed telemetry data to be shown to a user without cluttering the graphs. In this example, three tabs ("Telemetry," "Telemetry Text," and "Rule Violations") can be selected to display corresponding information. The values correspond to the point in time of bar 502. Thus, moving bar 502 causes the values to be updated in real time in the display.

Figure 6:
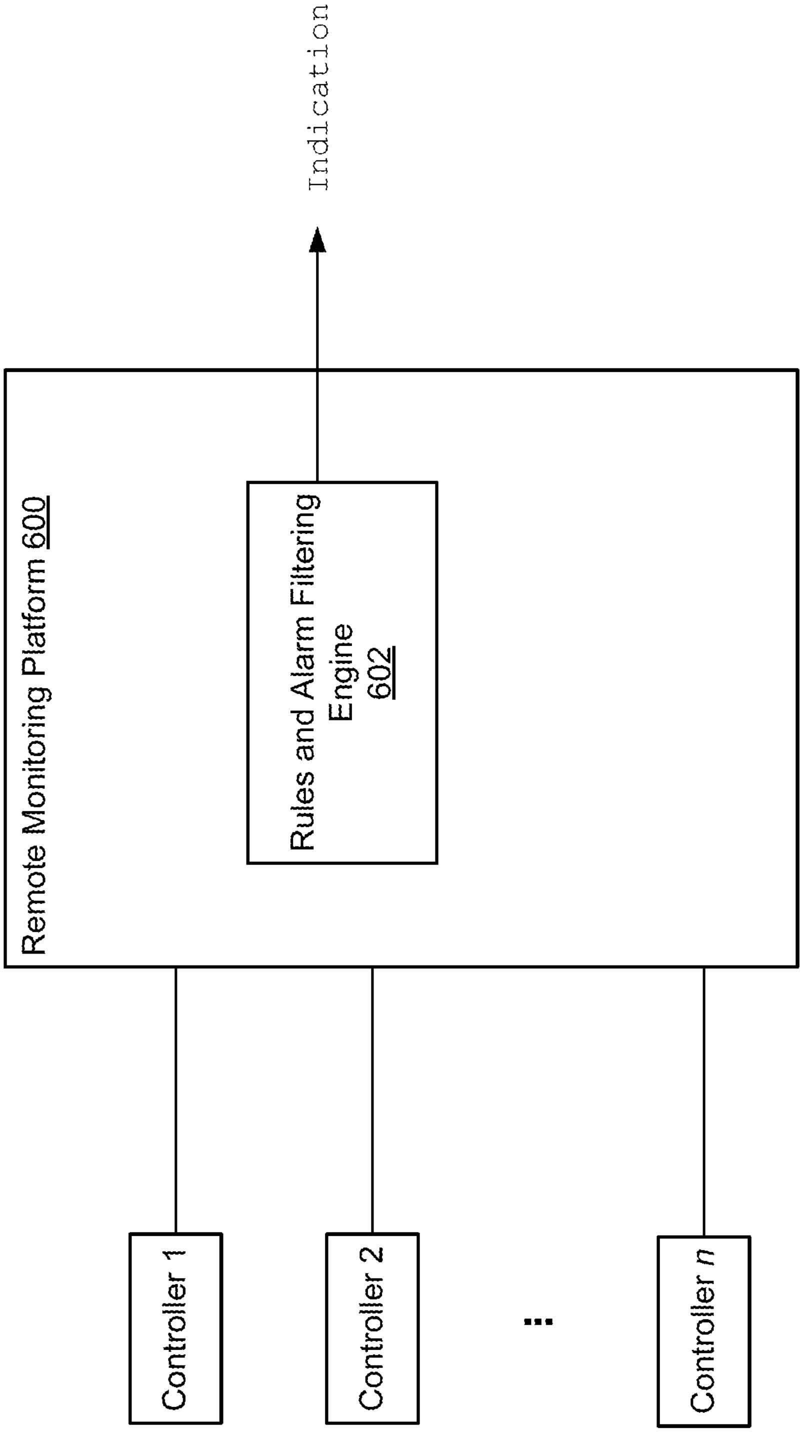
FIG. 6 illustrates a block diagram of an example system for remote monitoring of refrigeration systems according to aspects of the present disclosure.

FIG. 6 illustrates a block diagram of an example system for remote monitoring of refrigeration systems according to aspects of the present disclosure. In some instances, the system of FIG. 2 can be implemented by or included in platform 600. The graphical user interfaces shown in FIGS. 4, 5A and 5B can be displayed when a user accesses remote monitoring platform 600. An example of a remote monitoring system is vxObserve by Accruent®.

The system includes a remote monitoring platform 600 configured to determine and output predictive alerts about equipment being monitored by the platform. The platform can monitor equipment such as refrigeration systems via controllers (here, Controller 1 through Controller n). Each controller represents an IoT device (e.g., sensor, channel, device, or controller). For example, a temperature sensor in a refrigeration case is represented as a Controller. In various examples, the controllers support singular, grouped, and global setpoint and schedule changes. The controller interacts with Platform 600 via APIs.

The remote monitoring platform 600 includes a Rules Engine and Alarm Filtering Engine 602. Engine 602 is configured to perform the process of FIG. 1 to determine predictive rules. Engine 602 is configured to output flagged conditions (alerts), which alert a user to potential issues for which to take action. The flagged conditions can be routed to an appropriate group or user based on issue and severity. The flagged conditions can be output to a dashboard or user interface, an example of which is shown in FIG. 4. A refrigeration anomaly can be output as an indication on the dashboard or user interface.

Anomaly detection may be performed by a system (or by a distributed process operating within one or more devices or one or more networks) that monitors one or more different systems. The system may use one or more machine-learning models trained to perform various anomaly detection processes, as described herein, of various types of systems such as, but not limited to, refrigeration systems. The machine-learning models may be trained based on particular characteristics and parameters of the monitored systems. For instance, in refrigeration systems, the parameters may include, but are not limited to temperature data, temperature variation, setpoint data, environmental data (e.g., pressure, temperature, humidity, etc. of an area external from the refrigeration system, etc.), electrical data (e.g., received and/or derived from electrical components of the refrigeration system, historical open/closed status (e.g., such as a timestamp indicating when an opening of the refrigeration system was opened and exposing an internal chamber of the refrigeration system to an externa environment and a timestamp when the opening of the refrigeration system was closed and/or a time interval over which the opening was open and/or closed, etc.), combinations thereof, or the like. The parameters associated with other types of systems may include the same, similar, or different parameters based on the characteristics of the other systems. For instance, the parameters for a combustion engine systems may include, but are not limited to, temperature data, environmental data (e.g., pressure, temperature, humidity, etc. of an area external from the combustion engine, etc.), revolutions per minute (captured at particular time intervals or continuously, etc.), lubrication type, lubrication pressure or volume, size (e.g., displacement, mass, or volume, or the like), quantity of pistons or rotors, compression ratios, load, etc. An example of such a system may be system 704 of FIG. 7.

Figure 7:
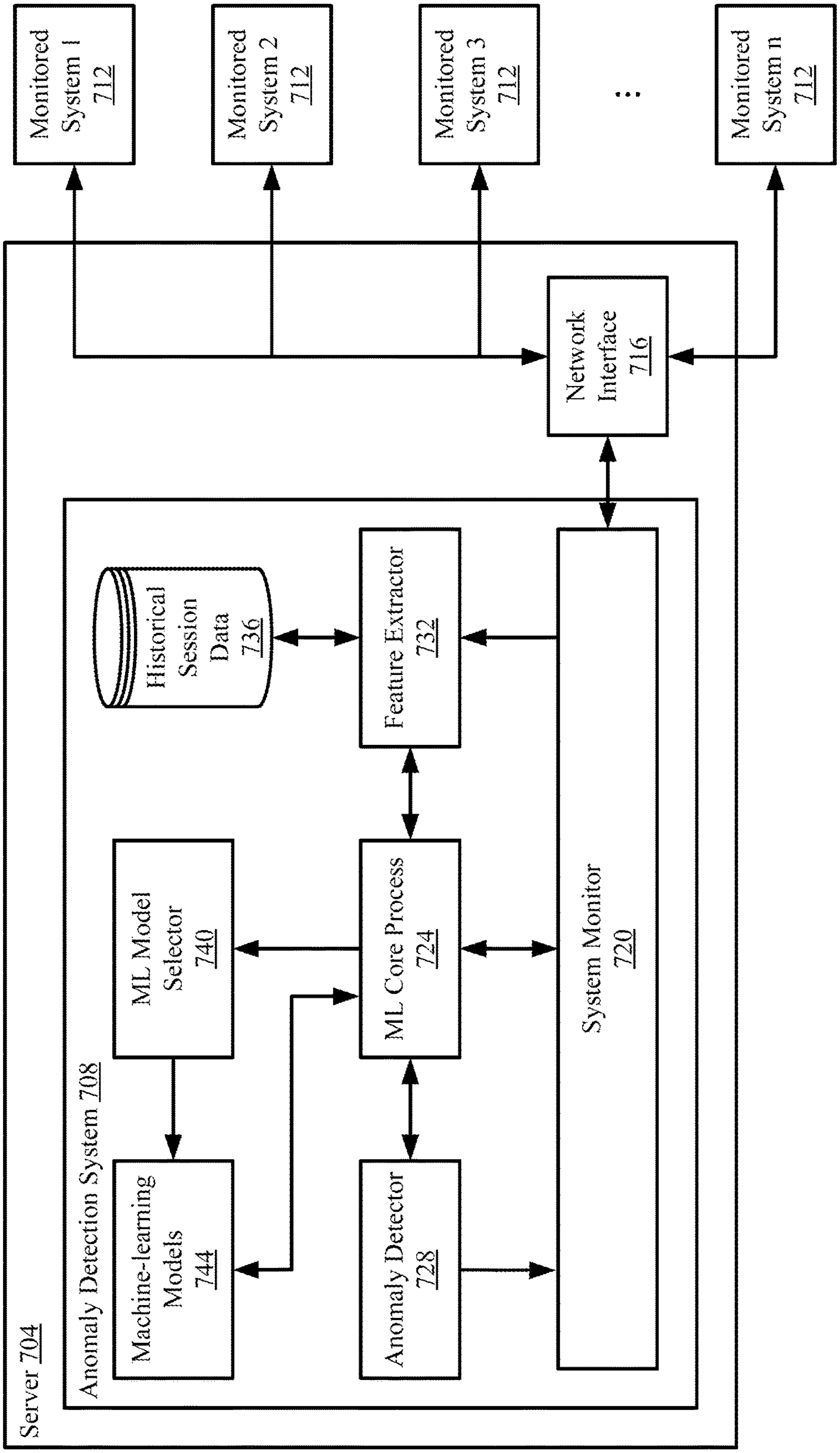
FIG. 7 illustrates a block diagram of an example system for remote monitoring of various types of systems according to aspects of the present disclosure.

FIG. 7 illustrates a block diagram of an example system for remote monitoring of various types of systems according to aspects of the present disclosure. Server 104 may be in communication with one or more monitored systems (e.g., one or more devices for which anomaly detection may be performed). Server 704 may include processing hardware (e.g., central processing unit, memory such as volatile and/or non-volatile memories, input/output interfaces, network interfaces, other components, or the like) and anomaly detection system 708, which may be configured to detect anomalies associated with one or more monitored systems 712 (e.g., monitored system 1, monitored system 2, monitored system 3, through monitored system n, etc.). In some instances, anomaly detection system 708 may include one or more processes executed by server 704. Alternatively, anomaly detection system 708 may be a distributed processes executed by one or more devices (such as, but not limited to server 704, etc.) or networks (e.g., cloud networks, etc.). In other instances, anomaly detection system 708 may be a processing device such as, but not limited to, an application-specific integrated circuit, field programmable gate array, mask programmable gate array, specialized-processing device combinations thereof, or the like that operates as a component of server 704, as component of one or more devices (e.g., providing anomaly detection (as previously described herein) in a distributed environment, etc.), or as a stand-alone component (e.g., a processing device configured to provide the anomaly detection functionality without the processing components of other devices (e.g., such as server 704 as shown).

Server 704 may include a network interface 716 that enables communications between server 704 and one or more monitored systems 712. One or more monitored systems 712 may be physically remote from server 704 and connected to network interface through one or more networks (e.g., the Internet, wide area networks, local area networks, mesh networks, cloud networks, etc.), through one or more satellites (e.g., using TCP/IP, one or more space communications protocol specification (SCPS) based protocols, etc.). In some instances, one or more of one or more monitored systems 112 may be directly connected to network interface 716 through a wired connect or a short-distance wireless protocol (e.g., Bluetooth, Wi-Fi, Zigbee, Z-wave, a propriety radio protocol, etc.).

One or more monitored systems 712 may be any device or set of devices configured to transmit status data (e.g., such as, but not limited to, diagnostic data, setpoint data, configuration data, sensor data, a status of the device or set of devices, user input associated with a status of the device or set of devices, and/or the like) to one or more devices such as server 704. One or more monitored systems 712 may include devices manufactured to transmit such status data, devices adapted to transmit such status data (e.g., such as a device modified to include a sensor that can transmit status data associated with the device), and devices for which a monitoring device is configured to captured and transmit status data associated with the devices. As such, one or more monitored systems 712 can include any device in which status data associated with an operational status of the device can be transmitted to a server including, but not limited to, refrigeration systems (as previously described). One or more monitored systems 712 may transmit status data to server 704 in regular intervals (e.g., according to a time interval), in batches (e.g., with each batch including an aggregate set of status data collected over a time interval, etc.), continuously (e.g., transmitted to server 704 as the status data is collected in real time or near real time, etc.), etc. For example, each monitored system may generate a data stream over which status data collected, derived, and/or generated by the monitored system may be transmitted to server 704.

Anomaly detection system 708 may receive status data from one or more monitored systems 712 via network interface 716. System monitor 720 may include one or more processes configured to manage the anomaly detection processes executed by anomaly detection system 708. System monitor 720 may connect to data streams, request status data from particular monitored systems, register new monitored systems, remove monitored systems from the systems being monitored for anomalies, etc. System monitor 720 may also transmit notifications, via network interface 716, in response to detecting an anomaly in a managed system. For example, system monitor 720 may transmit a communication to a system administrator of a monitored system in response to detecting an anomaly in that monitored system. The communication may include a predicted time or time interval over which the anomaly is expected to occur allowing the system administrator time to fix the monitored system before the anomaly occurs. Alternatively, or additionally, system monitor may transmit a communication to a repair technician configured to prevent the anomaly from occurring in the monitored system (e.g., by repairing or replace pans, debugging or reinstalling software, etc.).

System monitor 720 may receive status data from one or more data streams and route the status data to ML Core process 724 along with metadata identifying the monitored systems associated with the status data. System monitor 720 may also route the status data (and the metadata) to feature extractor 732. ML Core process 724 may monitor one or more machine-learning models configured to detect anomalies from the status data. ML Core process 724 may train new machine-learning models, retrain (or reinforce) existing machine-learning models, delete machine-learning models, and/or the like.

When a new monitored system or set of monitored systems is registered with anomaly detection system 708, ML core process 724 may provision and train one or more machine-learning models for the new monitored system or set of monitored systems. The one or more machine-learning models may be selected based on characteristics of the new monitored system or set of monitored systems, characteristics of status data transmitted by the new monitored system or set of monitored systems, user input (e.g., such as from an administrator of the new monitored system or set of monitored systems, an administrator of anomaly detection system 708, etc.). In some instances, at least one machine-learning model of the one or more machine-learning models may be a recurrent neural network (e.g., such as a gated recurrent unit, LSTM, LSTM autoencoders, partial autoencoders (e.g., encoder without a decoder or a decoder without an encoder, etc.), continuous-time, multi-order recurrent neural networks, fully recurrent, etc.) configured to generate predictions from sequenced datasets extracted from the status data from a monitored system.

Once registered, the new monitored system or set of monitored systems may begin transmitting initial status data to anomaly detection system 708. The initial status data may be aggregated by anomaly detection system 708 and used to train one or more machine-learning models configured to detect anomalies in the new monitored system or set of monitored systems. Feature extractor 732 may extract features from the initial status data and store the features in historical session data 736. Once a particular quantity of the initial status data from the new monitored system or set of monitored systems has been stored in historical session data 736, feature extractor 732 may generate one or more training datasets for the one or more machine-learning models. Each training dataset may include a portion of the features extracted from the initial status data received from the new monitored system or set of monitored systems based on an identification of the new monitored system or set of monitored systems, a type of system being monitored, a status of the new monitored system or set of monitored systems (e.g., whether the portion of the initial status data of the training dataset corresponds to an anomaly or a normal status, etc.), etc. In some instances, feature extractor 732 may generate, for each machine-learning model to be trained, one or more of a first training dataset configured to train a machine-learning model of the one or more machine-learning models, a second training dataset configured to validate the machine-learning model during and after training, a third training dataset for testing, and/or the like.

In some implementations, feature extractor 732 may preprocess the features stored historical session data 736 before generating a training dataset. Preprocessing can include, but is not limited to, normalizing the features (e.g., based on monitored system type, etc.), scaling the features (e.g., converting the features to a value between −1 and 1, etc.), dimensionality reduction (e.g., using principal component analysis, partial least squares, or the like to reduce the quantity of features), adding new features (e.g., using linear interpolation, forward filling, or the like to add additional features), and/or the like. In some examples, feature extractor 732 may remove portions of the status data (and/or features) that correspond to an anomaly (e.g., such as a failure status or condition, an alarm, an error, a fault, incorrect or faulty sensor measurements, a condition affecting an operation of the new monitored system or set of monitored systems, etc.). Since the machine-learning models are to be trained to detect an anomaly, the machine-learning models may be trained using the portion of the status data that corresponds normal conditions (non-anomalies) while omitting the portion of the status data that corresponds to anomalies. By omitting the portion of the status data that corresponds to anomalies, the training machine-learning model may be better able to detect data that does not correspond to normal conditions (e.g., anomalies).

The one or more machine-learning models may be trained to predict an occurrence of an anomaly at a future time or over a future time interval based on contemporaneously received status data In some instances, the output from the one or more machine-learning models may be a probability of an anomaly occurring at a particular time in the future (e.g., 24 hours, 48 hours, 72 hours, or any other time from the current time, etc.). Alternatively, one or more of the one or more machine-learning models may be output a distribution of probabilities (e.g., such as a Weibull distribution, hazard function, or the like) with each probability corresponding to the likelihood of anomaly occurring at a particular future time. By outputting a distribution, anomaly detection system 708 can detect the likelihood of an anomaly occurring over multiple different future times at once without retraining or executing the machine-learning model. The distribution of probabilities may correspond to a "time to failure" or the time until an anomaly likely to occur.

Feature extractor 732 may pass the one or more training datasets to ML core process 724 and ML core process 724 may initiate a training phase for the one or more machine-learning models. The one or more machine-learning models may be trained using supervised learning, unsupervised learning, self-supervised learning, or the like. The one or more machine-learning models may be trained for a predetermined time interval, a predetermined quantity of iterations, until one or more target accuracy metrics have exceeded a corresponding threshold function (e.g., accuracy, precision, area under the curve, logarithmic loss, F1 score, weighted human disagreement rate, cross entropy, mean absolute error, mean square error, etc.), user input, combinations thereof, or the like. Once trained, ML core process 724 may validate and/or test the trained machine-learning models using additional training datasets (e.g., such as the second training dataset and/or the third training dataset as previously described). Training can be updated using reinforcement learning as the machine-learning models are executed.

Once trained, ML core process 724 may manage the operation of the one or more machine-learning models (stored with other machine-learning models in machine-learning models 744). Status data received from monitored systems 712 may be received in real-time, regular intervals, batches, or the like. Feature extractor 732 may define feature vectors (e.g., a sequenced portion of the status data) from the status data. The feature vector may correspond to the contemporaneously received status data (e.g., real time status data) or a portion of the status data received over a predetermined time interval (e.g., the last n seconds of status data, etc.). Feature extractor 732 may preprocess the status data when generating the feature vector (e.g., normalizing features, interpolation to derive missing or incomplete features, etc.). For example, for refrigeration systems, the feature extractor 732 may normalize temperature values based on the current setpoint of the refrigeration system such that the temperature value can represented as the difference from the setpoint of the refrigeration system. In another example, feature extractor 732 may use interpolation (e.g., forward filling, linear interpolation, etc.) to add additional features corresponding to gaps in the status data (e.g., such as when a feature is missing, corrupted during transmission, etc.)

In some instances, feature extractor 732 may generate feature vectors in real time using overlapping windows (e.g., each feature vector includes a portion of status data that was included in the immediately previously generated feature vector). For example, status data may be received every t seconds. ML core process 724 may define a window length x (e.g., based on the machine-learning models, the monitored systems, user input, etc.) that correspond to status data received over a time interval of x length where x is greater than or equal to t. The overlapping window at time t=0 includes the status data received from t−x to t. When the next status data is received (e.g., at t=1), the overlapping window corresponds to t−x+1 to t+1 The overlapping window includes a portion of the status data that was previously passed as input into the machine-learning model. The overlapping window may ensure that all of the status data is processed by the machine-learning model, enable the machine-learning model to detect trends and/or anomalies in the status data, etc. Alternatively, the window may be non-overlapping. Alternatively, ML core process 724 may execute the one or more machine-learning models using historical status data (e.g., status data received over the previous 24 hours, previous week, previous month, or any user defined historical time interval, etc.).

Anomaly detection system 708 may monitor a variety of different types of devices. Anomaly detection system 708 may instantiate and train one or more machine-learning models each time a new monitored system registers with anomaly detection system 708, which may be tailored to detect anomalies in the new monitored system. In some instances, anomaly detection system 708 may provision and train one or more machine-learning models for particular device types, which may be usable when the machine-learning models trained for a particular monitored system are not available (e.g., accuracy is below one or more thresholds, the machine-learning models are being trained, etc.). Anomaly detection system 708 may use ML Model selector 740 to select a particular machine-learning model to process received status data.

When status data from a particular monitored system is received by system monitor 720, system monitor 720 may pass an identification of the particular monitored system to ML core process 724 (e.g., such as a system identifier, Internet Protocol (IP) address, an identification based on the status data, etc.). ML core process 724 may pass the identification to ML model selector 740, which identifies the machine-learning models that were trained for the particular monitored system in machine-learning models 744. If ML model selector 740 identifies the machine-learning model associated with the particular monitored system, ML model selector 740 passes the identification of the machine-learning model to ML core process 724. If ML model selector 740 identifies more than one machine-learning model associated with the particular monitored system, then ML model selector 740 may use one or more rules to select one or more machine-learning. In some instances, ML model selector 740 may select the machine-learning model with a highest accuracy based on the particular monitored system or the received status data. In other instances, ML model selector 740 may select the machine-learning model with a fastest execution rate. In other instances, ML model selector 740 may select the machine-learning model based on user input. In still yet other instances, ML model selector 740 may select more than the machine-learning models associated with the particular monitored system. In those instances, the machine-learning models may each process the status data to generate an output.

If ML model selector 740 cannot identify a machine-learning model associated with the particular monitored system, ML model selector 740 may identify a machine-learning model trained to detect anomalies in devices and/or systems similar to the particular monitored systems. For example, an ML model selector 740 may determine that particular monitored system a is a particular refrigeration system and identify a machine-learning model configured to detect anomalies in refrigeration systems (e.g., of a same or similar type as the particular refrigeration system).

An identification of the selected machine-learning model(s) may be passed to ML core process 724 ML core process 724 direct feature extractor 732 to begin generating feature vectors from the received status data. ML core process 724 may then execute the selected machine-learning model(s) using the feature vectors. The output from the selected machine-learning model(s) may be a probability of an anomaly occurring at a given future time (or over a future time interval) or a distribution of probabilities of anomalies occurring at one or more future times (or over one or more future time intervals). For example, the output from the selected machine-learning model(s) may be a probability of an anomaly occurring within the next 72 hours. The machine-learning model(s) may be trained to generate probabilities for a particular future time or time interval (or distribution of time intervals) by adjusting the type and quantity of training data used to train the machine-learning model(s) and/or by adjusting the training of the machine-learning model(s). ML core process 724 may pass the probabilities to anomaly detector 728, which may process the probabilities to determine when to indicate an anomaly has been detected. In some instances, anomaly detector 728 may apply thresholds such that if a probability is greater than a threshold probability, then anomaly detector 728 may indicate that an anomaly has been detected in the particular monitored system and will occur at the future time associated with the probability. Anomaly detector 728 may pass an indication of the particular anomaly to system monitor 720 and system monitor 720 may output the indication to a device associated with the particular monitored system. In some instances, system monitor 720 may automatically generate and transmit a repair request upon detecting the anomaly. The repair request may be transmitted an entity (e.g., such as a technician, mechanic, engineer, etc.) authorized to prevent the anomaly and/or repair the particular monitored system. The entity by a same entity that operates the particular monitored system or a third-party selected by the entity that operates the particular monitored system.

Figure 8:
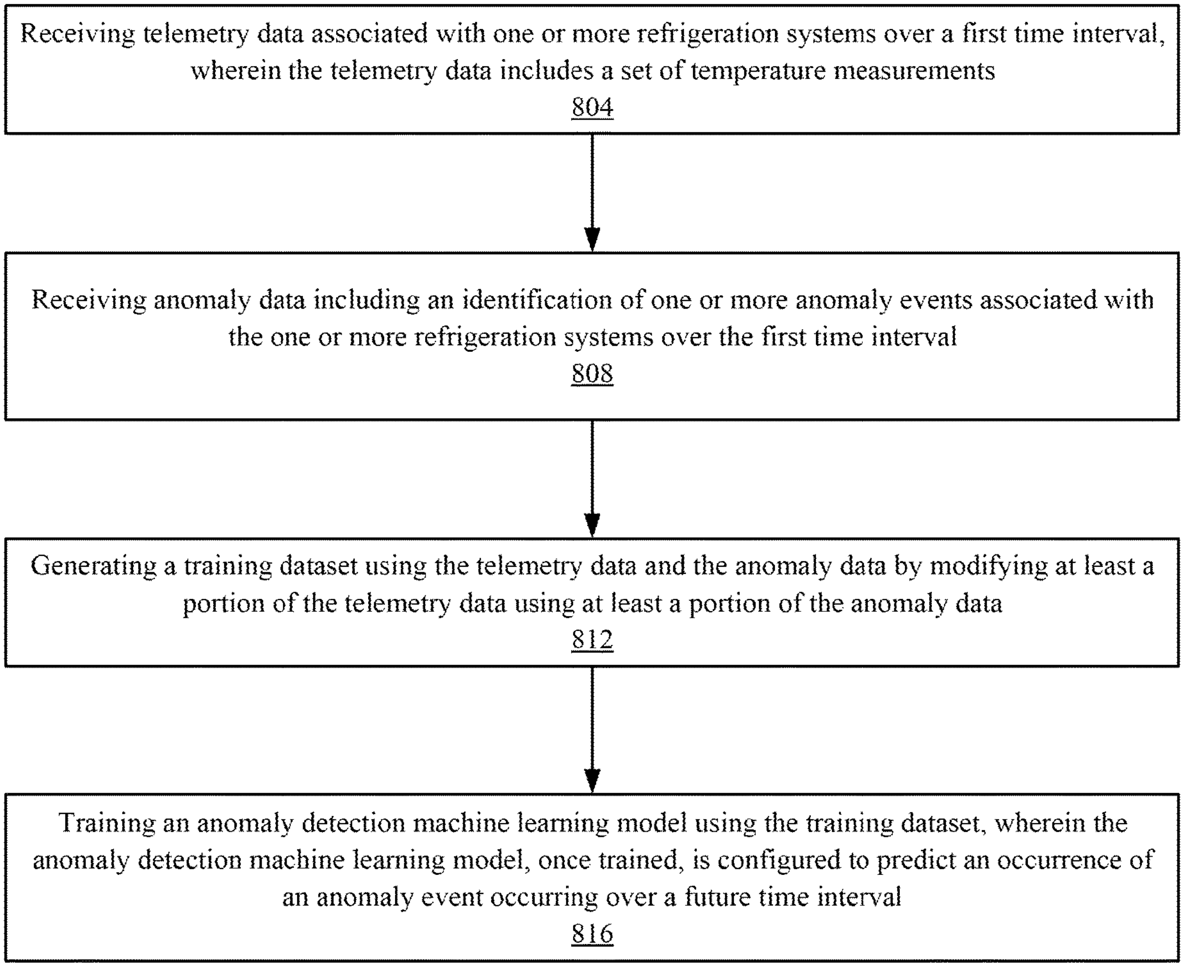
FIG. 8 is a flow diagram illustrating an example process for generating machine-learning models for anomaly detection in refrigeration systems according to aspects of the present disclosure.

FIG. 8 is a flow diagram illustrating an example process for generating machine-learning models for anomaly detection in refrigeration systems according to aspects of the present disclosure. At block 804, a computing device may receive telemetry data associated with one or more refrigeration systems over a first time interval, wherein the telemetry data includes a set of temperature measurements. The computing device may be configured to monitor the one or more refrigeration systems to predict a likelihood of an anomaly occurring in the future. The computing device may define a monitoring period (e.g., referred to as the first time interval) that determines the time interval over which telemetry data may be collected and used to train the machine-learning models of the computing device to detect anomalies. The monitoring period may be selected based on the quantity of time needed to collect a quantity of telemetry data usable to train a machine-learning model to a threshold accuracy.

At block 808, the computing device receives anomaly data including an identification of one or more anomaly events associated with the one or more refrigeration systems over the first time interval. An anomaly event may be any event in which at least one of the one or more regeneration systems ceased to operate as expected. For example, for refrigeration systems, an anomaly event may a temperature value being greater than or less than a threshold value relative to a temperature setpoint. For another example, an anomaly event may correspond to a failure of the compressor (e.g., causing the internal temperature to become uncontrolled, etc.).

At block 812, the computing device may generate a training dataset using the telemetry data and the anomaly data by modifying at least a portion of the telemetry data using at least a portion of the anomaly data. The computing device may correlate the anomaly data with the telemetry data to determine what portion of the telemetry data corresponds to the anomaly event. For instance, if the anomaly event occurred at a particular, the computing device may identify the portion of the telemetry data that occurred at that particular time. In some instances, the computing device may identify additional portions of the telemetry data as corresponding to the anomaly event such as the portions of the telemetry data at the particular time and a quantity of telemetry data that immediately preceded the particular time such as the preceding hour, 2 hours, 4 hours, etc. or the preceding day, 2 days, etc.

The computing device may remove the portion of the telemetry data that corresponds to the anomaly events such that the remaining telemetry data corresponds to normal operating conditions of the one or more refrigeration systems and no portion of remaining telemetry data corresponds to an anomaly event. The computing device may generate training data that excludes anomaly events to improve how machine-learning models are trained to detect anomaly events. By removing the portion of the telemetry data that corresponds to anomaly events, a machine-learning model may be trained on data that corresponds to normal operating conditions. Such training data may be very regular (e.g., the data values do not have a high degree of variability). The telemetry data associated with anomaly events may include data values that may not be regular (e.g., temperature, voltage or current, coolant levels, compressor cycles, etc. may fall outside normal operating conditions. Once trained, the machine-learning model may be better able to detect anomalous events when the telemetry data deviates from the normal operating conditions.

In some instances, the computing device may further process the telemetry data when generating the training data. For example, the computing device may normalize values (e.g., converting values to a common scale such as between −1 and 1 or any other scale, representing values relative to other values such as a temperature values relative to temperature setpoints, etc.), filling in missing or corrupt values (e.g., using an interpolation process such as forward filling, linear interpolation, etc.), dimensionality reduction (e.g., using principal component analysis, partial least squares, etc.), combinations thereof, or the like.

At block 816, the computing device may train an anomaly detection machine learning model using the training dataset. The computing device may train the anomaly detection machine-learning model using unsupervised learning, supervised learning, self-supervised learning, reinforcement learning, combinations thereof, or the like. For example, the computing device may begin training the anomaly detection machine learning model using unsupervised learning. The computing device may then use the anomaly detection machine learning model to generate labels for corresponding telemetry data passed as input that indicate whether the corresponding telemetry data corresponds to an anomaly event or a normal event. The labels may be used to further train the anomaly detection machine learning model during subsequent training iterations (e.g., self-supervised learning).

Once the anomaly detection machine learning model is trained, the anomaly detection machine learning model may be configured to predict an occurrence of an anomaly event occurring over a future time interval. The machine-learning model may be trained to predict an occurrence of an anomaly event occurring at a particular future time or over a particular future time interval. The particular future time or particular future time interval may be, but is not limited to, 24 hours, 48 hours, 72 hours, 1 week, 2 weeks, 3 weeks, 1 month, 2 months, 3 months, or any other future time or future time interval. The particular future time and/or time interval may be selected by adjusting the training of the machine-learning model. For example, the quantity of training data, the time interval over which the training data is collected, the quantity of training iterations, the accuracy metrics, etc.

In some instances, reinforcement learning may be performed during operation of the anomaly detection machine learning model. For instance, anomaly detection machine learning model may be used to predict a likelihood of an anomaly event occurring in the one or more refrigeration systems at a future time. The prediction may be tested (e.g., using statistical analysis or by waiting to see if the anomaly occurs) and the results of the test may be used to further refine the anomaly detection machine learning model. Reinforcement learning may be performed in regular intervals (e.g., every n-th output generated by the anomaly detection machine learning model, after n-days, etc.), according to one or more accuracy metrics (e.g., such as when an accuracy metric exceeds a threshold, etc.), according to user input, combinations thereof, or the like.

FIG. 9 illustrates a block diagram of an example computing device for anomaly detection for refrigeration systems according to aspects of the present disclosure. As will be apparent, other computer system architectures and configurations can be used to perform anomaly detection in various devices such as refrigeration systems. Computing device 700, which includes various subsystems as described below, includes at least one microprocessor subsystem (also referred to as a processor or a central processing unit (CPU)) 902. For example, processor 902 can be implemented by a single-chip processor or by multiple processors. In some examples, processor 902 is a general-purpose digital processor that controls the operation of the computing device 900. Using instructions retrieved from memory 910, the processor 902 controls the reception and manipulation of input data, and the output and display of data on output devices (e.g., display 918). In some examples, processor 902 may include and/or may be used to execute or perform the process described herein.

Processor 902 is coupled bi-directionally with memory 910, which can include a first primary storage, typically a random-access memory (RAM), and a second primary storage area, typically a read-only memory (ROM). As is well known in the art, primary storage can be used as a general storage area and as scratchpad memory, and can also be used to store input data and processed data. Primary storage can also store programming instructions and data, in the form of data objects and text objects, in addition to other data and instructions for processes operating on processor 902. Also as is well known in the art, primary storage typically includes basic operating instructions, program code, data and objects used by the processor 902 to perform its functions (e.g., programmed instructions). For example, memory 910 can include any suitable computer-readable storage media, described below, depending on whether, for example, data access needs to be bi-directional or uni-directional. For example, processor 902 can also directly and very rapidly retrieve and store frequently needed data in a cache memory (not shown).

A removable mass storage device 912 provides additional data storage capacity for the computing device 900 and may be coupled either bi-directionally (read/write) or uni-directionally (read only) to processor 902. For example, storage 912 can also include computer-readable media such as magnetic tape, flash memory, PC-CARDS, portable mass storage devices, holographic storage devices, and other storage devices. A fixed mass storage 920 can also, for example, provide additional data storage capacity. Mass storage 912, 920 generally store additional programming instructions, data, and the like that typically are not in active use by the processor 902. It will be appreciated that the information retained within mass storage 912 and 920 can be incorporated, if needed, in standard fashion as part of memory 910 (e.g., RAM) as virtual memory.

In addition to providing processor 902 access to storage subsystems, bus 914 can also be used to provide access to other subsystems and devices. As shown, these can include a display monitor 918, a network interface 916, a keyboard 904, and a pointing device 906, as well as an auxiliary input/output device interface, a sound card, speakers, and other subsystems as needed. For example, the pointing device 906 can be a mouse, stylus, track ball, or tablet, and is useful for interacting with a graphical user interface.

The network interface 916 allows processor 902 to be coupled to another computer, computer network, or telecommunications network using a network connection as shown. For example, through the network interface 916, the processor 902 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 902 can be used to connect the computing device 900 to an external network and transfer data according to standard protocols. For example, various processes disclosed herein can be executed on processor 902 or can be performed across a network such as the Internet, intranet networks, cloud networks (e.g., as a singular process or as distributed processes, etc.), or local area networks, in conjunction with a remote processor that shares a portion of the processing. Additional mass storage devices (not shown) can also be connected to processor 902 through network interface 916.

An auxiliary I/O device interface (not shown) can be used in conjunction with computing device 900. The auxiliary I/O device interface can include general and customized interfaces that allow the processor 902 to send and, more typically, receive data from other devices such as microphones, touch-sensitive displays, transducer card readers, tape readers, voice or handwriting recognizers, biometrics readers, cameras, portable mass storage devices, and other computers.

In addition, various examples disclosed herein further relate to computer storage products with a computer readable medium that includes program code for performing various computer-implemented operations. The computer-readable medium is any data storage device that can store data which can thereafter be read by a computer system. Examples of computer-readable media include but are not limited to magnetic media such as hard disks, floppy disks, and magnetic tape; optical media such as CD-ROM disks: magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 9 is but an example of a computer system suitable for use with the various examples disclosed herein. Other computer systems suitable for such use can include additional or fewer subsystems. In addition, bus 914 is illustrative of any interconnection scheme serving to link the subsystems. Other computer architectures having different configurations of subsystems can also be utilized.

The following examples illustrate various aspects of the present disclosure. As used below, any reference to a series of examples is to be understood as a reference to each of those examples disjunctively (e.g., "Examples 1-4" is to be understood as "Examples 1, 2, 3, or 4").

Example 1 is a method, comprising: receiving telemetry data of one or more refrigeration systems, including measured temperature values and setpoint temperature values; processing the telemetry data to determine machine learning input data based at least in part on at least a portion of the measured temperature values and at least a portion of the setpoint temperature values; using one or more hardware processors to apply the machine learning input data to a trained anomaly detection machine learning model to determine periodic anomaly metrics; and providing an automatically determined indication based at least in part on at least a portion of the periodic anomaly metrics.

Example 2 is a method, comprising: receiving telemetry data associated with one or more refrigeration systems over a first time interval, wherein the telemetry data includes a set of temperature measurements; receiving anomaly data including an identification of one or more anomaly events associated with the one or more refrigeration systems over the first time interval; generating a training dataset using the telemetry data and the anomaly data by modifying at least a portion of the telemetry data using at least a portion of the anomaly data; and training an anomaly detection machine learning model using the training dataset, wherein the anomaly detection machine learning model, once trained, is configured to predict an occurrence of an anomaly event occurring over a future time interval.

Example 3 is the method of any of example(s) 1-2 and 4-22, wherein the telemetry data is collected by one or more sensors associated with the one or more refrigeration systems.

Example 4 is the method of any of example(s) 1-3 and 5-22, wherein at least one of the one or more sensors is a component included in the one or more refrigeration systems.

Example 5 is the method of any of example(s) 1-4 and 6-22, wherein at least one of the one or more sensors is configured to measure an ambient condition external to the one or more refrigeration systems.

Example 6 is the method of any of example(s) 1-5 and 7-22, wherein the telemetry data is collected periodically and continuously.

Example 7 is the method of any of example(s) 1-6 and 8-22, wherein processing the telemetry data to determine the machine learning input data includes at least one of: transforming categorical variables, forward filling, determining relative values, or normalizing values.

Example 8 is the method of any of example(s) 1-7 and 9-22, wherein the periodic anomaly metrics includes at least one of: an anomaly score or an anomaly count.

Example 9 is the method of example(s) 1-8 and 10-22, further comprising generating an anomaly alert in response to the anomaly score exceeding a score threshold for a threshold period of time; wherein: the threshold period of time is based at least in part on the anomaly count; and the automatically determined indication is based at least in part on the generated anomaly alert.

Example 10 is the method of any of example(s) 1-9 and 11-22, wherein the anomaly detection machine learning model is trained using self-supervised learning.

Example 11 is the method of any of example(s) 1-10 and 12-22, wherein the anomaly detection machine learning model includes an autoencoder.

Example 12 is the method of any of example(s) 1-11 and 13-22, further comprising processing at least a portion of the periodic anomaly metrics including by categorizing an anomaly metric based at least in part on a threshold to predict a likelihood of an equipment failure within a threshold failure time.

Example 13 is the method of any of example(s) 1-12 and 14-22, wherein providing the automatically determined indication includes outputting the indication to a user interface of a diagnostic tool.

Example 14 is the method of any of example(s) 1-13 and 15-22, wherein providing the automatically determined indication includes outputting, on a user interface, anomaly data and refrigeration-dependent data.

Example 15 is the method of any of example(s) 1-14 and 16-22, wherein the refrigeration-dependent data includes work order data.

Example 16 is the method of any of example(s) 1-15 and 17-22, wherein the automatically determined indication is provided on a graph.

Example 17 is the method of any of example(s) 1-16 and 18-22, wherein providing the automatically determined indication includes displaying information associated with a user-selected point in time on the graph.

Example 18 is the method of any of example(s) 1-17 and 19-22, further comprising training the anomaly detection machine learning model including by: receiving a set of datapoints; for each datapoint in the set of datapoints determining an anomaly score, and determining whether to update an anomaly count based on whether the anomaly score meets a score threshold; and determining a predictive alert based at least in part on the anomaly count; wherein the automatically determined indication is based at least in part on the predictive alert.

Example 19 is the method of any of example(s) 1-18 and 20-22, wherein determining the predictive alert based at least in part on the anomaly count includes generating the predictive alert in response to the anomaly count being above a count threshold.

Example 20 is the method of any of example(s) 2-19 and 21-22, wherein generating the training dataset includes: identifying a subset of the telemetry data that corresponds to an anomaly event; and removing the subset of the telemetry data from the telemetry data.

Example 21 is the method of any of example(s) 2-20 and 22, wherein generating the training dataset includes modifying the telemetry data using one of forward filling, determined relative values, normalizing values, or linear interpolation.

Example 22 is the method of any of example(s) 1-21, wherein the anomaly detection machine learning model is a recurrent neural network.

Example 23 is a system, comprising one or more processors; and a non-transitory computer-readable medium comprising instructions that when executed by the one or more processors cause the one or more processor to perform any of example(s) 1-22.

Example 24 is a computer program product embodied in a non-transitory computer-readable medium comprising instructions that when executed by one or more processors cause the one or more processor to perform any of example(s) 1-22.

Some portions of the detailed description may be presented in terms of algorithms and/or symbolic representations of operations on information. These algorithmic descriptions and representations are the means used by those skilled in the data processing arts to most effectively convey the substance of their work to others skilled in the art. These operations, while described functionally, computationally, or logically, are understood to be implemented by computer programs or equivalent electrical circuits, microcode, or the like. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated In some instances, operations may be referred to as components or modules, without loss of generality. The described operations may be embodied in software, firmware, hardware, or any combinations thereof.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as “processing” or “computing” or “calculating” or “determining” or “displaying” or “generating” or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the methods of some examples. The structure for a variety of these systems is described in the present disclosure (e.g., as shown and described in connection to FIG. 9, etc.) as including various physical hardware components configured to be combined in discrete implementations of the present disclosure. The techniques are not described with reference to any particular programming language, hardware component, configuration of hardware components, etc. Various examples may thus be implemented using a variety of programming languages, hardware components, etc.

In various implementations, the systems may operate as a standalone device(s) or may be connected (e.g., networked) to other systems. In a networked deployment, the systems may operate as a client and/or server in a client-server network environment, as one or more devices in a cloud network, as a peer system in a peer-to-peer (or distributed) network environment, and/or the like.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms “connected,” “coupled.” or any variant thereof when applying to modules of a system, means any connection or coupling, either direct or indirect, between two or more elements; the coupling of connection between the elements can be physical, logical, or any combination thereof. Additionally, the words “herein,” “above,” “below,” and words of similar import, when used in this application, shall refer to this application as a whole and not to any particular portions of this application. It is understood that the use of relational terms, if any, such as first, second, top and bottom, and the like are used solely for distinguishing one entity or action from another, without necessarily requiring or implying any such actual relationship or order between such entities or actions. Where the context permits, words in the above Detailed Description using the singular or plural number may also include the plural or singular number respectively. The word “or,” in reference to a list of two or more items, covers all of the following interpretations of the word: any of the items in the list, all of the items in the list, or any combination of the items in the list.

While processes or blocks are presented in a given order, alternative implementations may perform routines having steps, or employ systems having blocks, in a different order, and some processes or blocks may be deleted, moved, added, subdivided, substituted, repeated, combined, and/or modified to provide alternative or sub combinations. Each of these processes or blocks may be implemented in a variety of different ways. Also, while processes or blocks are at times shown as being performed in series, these processes or blocks may instead be performed in parallel (e.g., concurrently or temporally offset) or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words “means for”. Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term, the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various examples given in this specification.

Any of the steps, operations, or processes described herein may be performed or implemented with one or more hardware and/or software modules, alone or in combination with other devices.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

The language used in the specification has been principally selected for readability and instructional purposes, and it may not have been selected to delineate or circumscribe the subject matter. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure any implementations in unnecessary detail. In other instances, well-known circuits, processes, algorithms, structures, and techniques may be shown without unnecessary detail in order to avoid obscuring an implementation.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a non-transitory computer-readable or machine-readable storage medium (e.g., a medium for storing program code or code segments). A processor(s), implemented in an integrated circuit, may perform the necessary tasks.

The foregoing detailed description of the technology has been presented for purposes of illustration and description. It is not intended to be exhaustive or to limit the technology to the precise form disclosed. Many modifications and variations are possible in light of the above teaching. The described examples, implementations, etc. were chosen in order to best explain the principles of the technology, its practical application, and to enable others skilled in the art to utilize the technology in various embodiments and with various modifications as are suited to the particular use contemplated. It is intended that the scope of the technology be defined by the claim.

The invention claimed is:

1. A method, comprising:

receiving telemetry data associated with one or more refrigeration systems over a first time interval, wherein the telemetry data includes a set of temperature measurements;

receiving anomaly data including an identification of one or more anomaly events associated with the one or more refrigeration systems over the first time interval;

generating a training dataset using the telemetry data;

modifying the training dataset by removing, from the training dataset, a portion of the telemetry data that corresponds to an anomaly event based on the anomaly data; and training an anomaly detection machine learning model using the modified training dataset, wherein the anomaly detection machine learning model, once trained, is configured to predict an occurrence of an anomaly event occurring over a future time interval.

2. The method of claim 1, wherein the telemetry data is collected by one or more sensors associated with the one or more refrigeration systems.

3. The method of claim 2, wherein at least one of the one or more sensors is configured to measure an ambient condition external to the one or more refrigeration systems.

4. The method of claim 1, wherein the telemetry data is collected periodically and continuously.

5. The method of claim 1, wherein generating the training dataset includes modifying the telemetry data using one of forward filling, determined relative values, normalizing values, or linear interpolation.

6. The method of claim 1, wherein the anomaly detection machine learning model is a recurrent neural network.

7. A system, comprising:

one or more processors; and a non-transitory computer-readable medium comprising instructions that when executed by the one or more processors cause the one or more processors to perform operations including:

receiving telemetry data associated with one or more refrigeration systems over a first time interval, wherein the telemetry data includes a set of temperature measurements;

receiving anomaly data including an identification of one or more anomaly events associated with the one or more refrigeration systems over the first time interval;

generating a training dataset using the telemetry data;

modifying the training dataset by removing, from the training dataset, a portion of the telemetry data that corresponds to an anomaly event based on the anomaly data; and training an anomaly detection machine learning model using the modified training dataset, wherein the anomaly detection machine learning model, once trained, is configured to predict an occurrence of an anomaly event occurring over a future time interval.

8. The system of claim 7, wherein the telemetry data is collected by one or more sensors associated with the one or more refrigeration systems.

9. The system of claim 8, wherein at least one of the one or more sensors is configured to measure an ambient condition external to the one or more refrigeration systems.

10. The system of claim 7, wherein the telemetry data is collected periodically and continuously.

11. The system of claim 7, wherein generating the training dataset includes modifying the telemetry data using one of forward filling, determined relative values, normalizing values, or linear interpolation.

12. The system of claim 7, wherein the anomaly detection machine learning model is a recurrent neural network.

13. A non-transitory computer-readable medium comprising instructions that when executed by one or more processors cause the one or more processors to perform operations including:

receiving telemetry data associated with one or more refrigeration systems over a first time interval, wherein the telemetry data includes a set of temperature measurements;

receiving anomaly data including an identification of one or more anomaly events associated with the one or more refrigeration systems over the first time interval;

generating a training dataset using the telemetry data;

modifying the training dataset by removing, from the training dataset, a portion of the telemetry data that corresponds to an anomaly event based on the anomaly data; and training an anomaly detection machine learning model using the modified training dataset, wherein the anomaly detection machine learning model, once trained, is configured to predict an occurrence of an anomaly event occurring over a future time interval.

14. The non-transitory computer-readable medium of claim 13, wherein the telemetry data is collected by one or more sensors associated with the one or more refrigeration systems.

15. The non-transitory computer-readable medium of claim 14, wherein at least one of the one or more sensors is configured to measure an ambient condition external to the one or more refrigeration systems.

16. The non-transitory computer-readable medium of claim 13, wherein the telemetry data is collected periodically and continuously.

17. The non-transitory computer-readable medium of claim 13, wherein generating the training dataset includes modifying the telemetry data using one of forward filling, determined relative values, normalizing values, or linear interpolation.

18. The non-transitory computer-readable medium of claim 13, wherein the anomaly detection machine learning model is a recurrent neural network.

* * * * *